United States Patent
Fujiki et al.

(10) Patent No.: US 11,271,243 B2
(45) Date of Patent: Mar. 8, 2022

(54) ALL-SOLID SECONDARY BATTERY

(71) Applicant: Samsung Electronics Co., Ltd., Gyeonggi-do (KR)

(72) Inventors: Satoshi Fujiki, Kanagawa (JP); Takanobu Yamada, Kanagawa (JP); Taku Watanabe, Kanagawa (JP); Yuichi Aihara, Kanagawa (JP); Shiratsuchi Tomoyuki, Kanagawa (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 268 days.

(21) Appl. No.: 16/143,620

(22) Filed: Sep. 27, 2018

(65) Prior Publication Data

US 2019/0190064 A1    Jun. 20, 2019

(30) Foreign Application Priority Data

Dec. 18, 2017   (JP) .............................. JP2017-241372
May 10, 2018   (KR) ......................... 10-2018-0053929

(51) Int. Cl.
*H01M 4/38*       (2006.01)
*H01M 4/40*       (2006.01)
(Continued)

(52) U.S. Cl.
CPC ....... *H01M 10/0562* (2013.01); *H01M 4/131* (2013.01); *H01M 4/134* (2013.01);
(Continued)

(58) Field of Classification Search
CPC ............. H01M 10/0562; H01M 4/623; H01M 10/0481; H01M 10/052; H01M 10/42;
(Continued)

(56) References Cited

U.S. PATENT DOCUMENTS 9,399,404 B2 *   7/2016  Ose ........................ B60L 50/64
9,698,443 B2     7/2017  Hata et al.
(Continued)

FOREIGN PATENT DOCUMENTS

JP   2008103284 A   5/2008
JP   2011142007 A   7/2011
(Continued)

OTHER PUBLICATIONS

Micrometrics®. Density Analysis. 2001. http://www.micromeritics.com (Year: 2001).*

(Continued)

*Primary Examiner* — Christian Roldan
(74) *Attorney, Agent, or Firm* — Cantor Colburn LLP (57) ABSTRACT

An all-solid secondary battery, comprising: a cell comprising a positive electrode active material layer, a negative electrode active material comprising at least one of lithium metal and a lithium-containing alloy, and a solid electrolyte layer disposed between the positive electrode active material layer and the negative electrode active material layer, wherein a ratio of volume density to true density of the positive electrode active material layer is about 0.6 or greater, wherein a ratio of volume density to true density of the solid electrolyte layer is about 0.6 or greater, and wherein an average pressure applied to opposite sides of the solid electrolyte layer in a fully discharged state is greater than 0 megapascals and 7.5 megapascals or less.

15 Claims, 2 Drawing Sheets (51) Int. Cl.
    *H01M 4/62*         (2006.01)
    *H01M 4/66*         (2006.01)
    *H01M 10/04*       (2006.01)
    *H01M 4/02*         (2006.01)
    *H01M 10/0562*     (2010.01)
    *H01M 10/0525*     (2010.01)
    *H01M 4/134*       (2010.01)
    *H01M 4/131*       (2010.01)
    *H01M 4/52*         (2010.01)
    *H01M 10/052*      (2010.01)
    *H01M 10/42*       (2006.01)
    *H01M 4/525*       (2010.01)
    *H01M 10/48*       (2006.01)
    *H01M 4/505*       (2010.01)
(52) U.S. Cl.
    CPC ........... *H01M 4/382* (2013.01); *H01M 4/405* (2013.01); *H01M 4/505* (2013.01); *H01M 4/52* (2013.01); *H01M 4/525* (2013.01); *H01M 4/621* (2013.01); *H01M 4/622* (2013.01); *H01M 4/623* (2013.01); *H01M 4/661* (2013.01); *H01M 10/04* (2013.01); *H01M 10/0481* (2013.01); *H01M 10/052* (2013.01); *H01M 10/0525* (2013.01); *H01M 10/42* (2013.01); *H01M 10/48* (2013.01); *H01M 2004/021* (2013.01); *H01M 2004/027* (2013.01); *H01M 2004/028* (2013.01); *H01M 2300/0065* (2013.01); *H01M 2300/0068* (2013.01)
(58) Field of Classification Search
    CPC ...... H01M 4/525; H01M 10/48; H01M 4/405; H01M 4/382; H01M 4/622; H01M 4/505; H01M 10/0525; H01M 4/134; H01M 4/131; H01M 4/621; H01M 10/04; H01M 4/52; H01M 4/661; H01M 2004/021; H01M 2300/0068; H01M 2300/0065; H01M 2004/027; H01M 2004/028; Y02E 60/10
    USPC ........................................................ 429/304
    See application file for complete search history.

(56) References Cited

U.S. PATENT DOCUMENTS

| | | |
|---|---|---|
| 9,882,234 B2 | 1/2018 | Kosaka et al. |
| 2009/0047562 A1 | 2/2009 | Hata et al. |
| 2011/0162198 A1 | 7/2011 | Kawamoto et al. |
| 2012/0028128 A1* | 2/2012 | Seino ............... C01G 53/42 429/304 |
| 2015/0171428 A1* | 6/2015 | Fujiki ............... H01M 10/0562 429/322 |
| 2016/0104891 A1* | 4/2016 | Holme .................. H01M 4/667 429/303 |
| 2018/0351159 A1* | 12/2018 | Fujiki .................... H01M 4/622 |
| 2019/0165345 A1* | 5/2019 | Koetting ........... H01M 10/0481 |

FOREIGN PATENT DOCUMENTS

| | | |
|---|---|---|
| JP | 2012069305 A | 4/2012 |
| JP | 2013008684 A | 1/2013 |
| JP | 2015095281 A | 5/2015 |
| JP | 2015106550 A | 6/2015 |
| JP | 2016018704 A | 2/2016 |
| JP | 2017010816 A | 1/2017 |
| JP | 6085304 B2 | 2/2017 |

OTHER PUBLICATIONS

Seitaro Ito et al., "A rocking chair type all-solid-state lithium ion battery adopting Li2O-ZrO2 coated LiNi0.8Co0.15Al0.05O2 and a sulfide based electrolyte", Journal of Power Sources, Feb. 15, 2014, pp. 943-950, vol. 248.

Seitaro Ito et al., "A synthesis of crystalline Li7P3S11 solid electrolyte from 1,2-dimethoxyethane solvent," Journal of Power Sources, Dec. 20, 2014, pp. 342-345, vol. 271.

* cited by examiner

FIG. 1

ALL-SOLID SECONDARY BATTERY

CROSS-REFERENCE TO RELATED APPLICATIONS

This application claims the benefit of and priority to Japanese Patent Application No. 2017-241372, filed on Dec. 18, 2017, in the Japanese Patent Office, and Korean Patent Application No. 10-2018-0053929, filed on May 10, 2018, in the Korean Intellectual Property Office, and all the benefits accruing therefrom under 35 U.S.C. § 119, the contents of which are incorporated herein in their entireties by reference.

BACKGROUND

1. Field

The present disclosure relates to an all-solid secondary battery.

2. Description of the Related Art

Recently, all-solid secondary batteries have attracted attention. An all-solid secondary battery includes a positive electrode active material layer, a negative electrode active material layer, and a solid electrolyte layer located between these active material layers. In the all-solid secondary battery, a solid electrolyte is used as a medium for conducting lithium ions.

Such all-solid secondary batteries are different from traditional lithium ion batteries in that all constituents of the all-solid secondary batteries are solid materials. To increase the energy density of such an all-solid secondary battery, lithium metal has been used as a negative electrode active material. Since the interface between an electrode active material and a solid electrolyte is a solid-solid interface, there is a problem in that the electrode active material and the solid electrolyte become separated from each other at the solid-solid interface as a result of the expansion/contraction of the active material due to charging and discharging.

Thus, there remains a need for an improved all-solid secondary battery.

SUMMARY

According to an embodiment, an all-solid secondary battery includes: a positive electrode active material layer, a negative electrode active material layer including at least one of lithium metal and a lithium-containing alloy, and a solid electrolyte layer disposed between the positive electrode active material layer and the negative electrode active material layer, wherein a ratio of volume density to true density of the positive electrode active material layer is about 0.6 or greater, a ratio of volume density to true density of the solid electrolyte layer is about 0.6 or greater, wherein an average pressure applied to opposite sides of the solid electrolyte layer in a fully discharged state is greater than 0 megapascals and 7.5 megapascals or less, wherein a ratio of a standard deviation of a pressure distribution of the pressure applied to opposite sides of the solid electrolyte layer to the average pressure applied to the opposite sides of the solid electrolyte layer in the fully discharged state is about 0.35 or less.

In this regard, in the all-solid secondary battery, the pressure at each pressure application site of a plurality of sites may be set to be substantially uniform depending on the average applied pressure to the plurality of sites. Therefore, the intensity of current flowing in the cell becomes uniform at each site. Further, since the expansion/contraction at each site of the cell is uniform, separation of each layer at the solid-solid interface is prevented. As a result, in the all-solid secondary battery, the battery performance, particularly cycle characteristics, are improved.

The average pressure ($P_{ave}$) may be about 0.5 megapascal to about 6.0 megapascal.

In this regard, the battery characteristics of the all-solid secondary battery are improved.

The thickness of the solid electrolyte layer may be about 50 micrometers to about 100 micrometers.

In this regard, current flows more uniformly in the solid electrolyte layer at the time of charging the all-solid secondary battery. Thus, lithium metal may be more uniformly distributed in the negative electrode active material layer, such that it is difficult for a short circuit to occur.

The solid electrolyte layer may include a solid electrolyte including at least one of sulfur, silicon, phosphorus, and boron.

In this regard, the lithium ion conductivity of the solid electrolyte layer may be improved, and the battery characteristics of the all-solid secondary battery are improved.

The negative electrode active material layer may be a lithium metal layer.

In this regard, the energy density of the all-solid secondary battery is improved.

One surface of the cell may have an area of about 20 inverse centimeters to about 1500 centimeters.

In this regard, the effects obtained in the present disclosure are remarkable, and the occurrence of a short circuit is more reliably prevented.

The all-solid secondary battery may further include: a pair of pressure applying members disposed on opposite sides of the cell to apply the pressure to the opposite sides of the cell; and a plurality of pressure control members disposed in contact with a plurality of sites of the pressure applying members to control the pressure applied by the pair of pressure applying members to the cell for each site of the plurality of sites on the opposite sides of the battery cell.

In this regard, pressure is relatively uniformly applied to the battery cell while being controlled.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Expressions such as "at least one of," when preceding a list of elements, modify the entire list of elements and do not modify the individual elements of the list. "At least one of" does not exclude like elements not named.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

A C rate means a current which will discharge a battery in one hour, e.g., a C rate for a battery having a discharge capacity of 1.6 ampere-hours would be 1.6 amperes.

In order to secure the characteristics of all-solid secondary batteries, there have been attempts to operate cells under an applied pressure. If pressure is applied using torque from a set screw, the electrolyte conforms to the expansion/contraction of a positive electrode active material and a negative electrode active material during charging and discharging, the isolation of electrode active materials and an increase in resistance can be suppressed. As a result, various effects may be obtained, such as improvement in charge/discharge of a battery, suppression of deterioration of output characteristics, and improved capacity retention during a cycle test.

In order to increase the energy density of an all-solid secondary battery, lithium metal can be used as a negative electrode active material. The reason for this is that it is possible to increase the output of an all-solid secondary battery while flattening the all-solid secondary battery by using lithium metal as a negative electrode active material. However, when lithium metal is used as a negative electrode active material, a short circuit is easily caused when pressure is simply applied to an all-solid secondary battery. To avoid the short circuit, a carbon-based material can used as a negative electrode active material, however, a pressure-applied all-solid secondary battery in which lithium metal is used as a negative electrode active material would be preferred.

Disclosed is an improved all-solid secondary battery including lithium metal or a lithium-containing alloy in a negative electrode active material and capable of preventing a short circuit even when pressure is applied.

Hereinafter, one or more embodiments will be described in detail by explaining exemplary embodiments with reference to the accompanying drawings. In addition, like reference numerals in the present specification and drawings denote like elements, and thus their description will be omitted.

The present inventors provide herein one or more embodiments of an all-solid secondary battery including lithium metal or a lithium-containing alloy as a negative electrode active material.

As described above, to avoid a short circuit a carbon-based material can used as a negative electrode active material, because when a negative electrode active material is used without further consideration, the present inventors have found that a short circuit was caused when pressure was applied to an all-solid secondary battery in which lithium metal is used as a negative electrode active material.

Therefore, as a result of analyzing a pressure distribution applied to an all-solid secondary battery in order to clarify the cause of a short circuit, the present inventors have found that uneven pressure is applied to each portion of the all-solid secondary battery. Further, the present inventors have found that a short circuit occurs at a portion of an all-solid secondary battery to which relatively low pressure is applied. While not wanting to be bound by theory, it is presumed that at the portion of an all-solid secondary battery to which relatively low pressure is applied, the solid-solid interface of each layer is easily separated by the expansion/contraction due to charging and discharging, and, as a result, the flow of current becomes non-uniform at the interface thereof. Further, it is presumed that lithium metal is locally precipitated, and the precipitated lithium metal is grown in a solid electrolyte layer, and thus a short circuit easily occurs. Therefore, to prevent a short circuit it is preferred that the pressure applied is uniform at each portion of an all-solid secondary battery.

Further, as a result of examination, the present inventors have found that the degree of uniformity of pressure allowable for preventing a short circuit may be changed depending on the intensity of the applied pressure. Moreover, as a result of examination, the present inventors have reached an all-solid secondary battery according to one or more embodiments to be described in greater detail.

Further, it is presumed that a relationship between non-uniformity of the applied pressure and a short circuit is particularly problematic when lithium metal or a lithium-containing alloy is used. That is, the lithium metal or the lithium-containing alloy is soft compared to other negative electrode active materials such as carbonaceous materials and is deformed when pressure is applied, so that the lithium metal or the lithium-containing alloy is apt to penetrate a solid electrolyte layer at a portion where pressure is greater. Therefore, it is considered that a large amount of current locally flows and thus a short circuit easily occurs. Hereinafter, one or more embodiments will be described in further detail.

Figure 1:
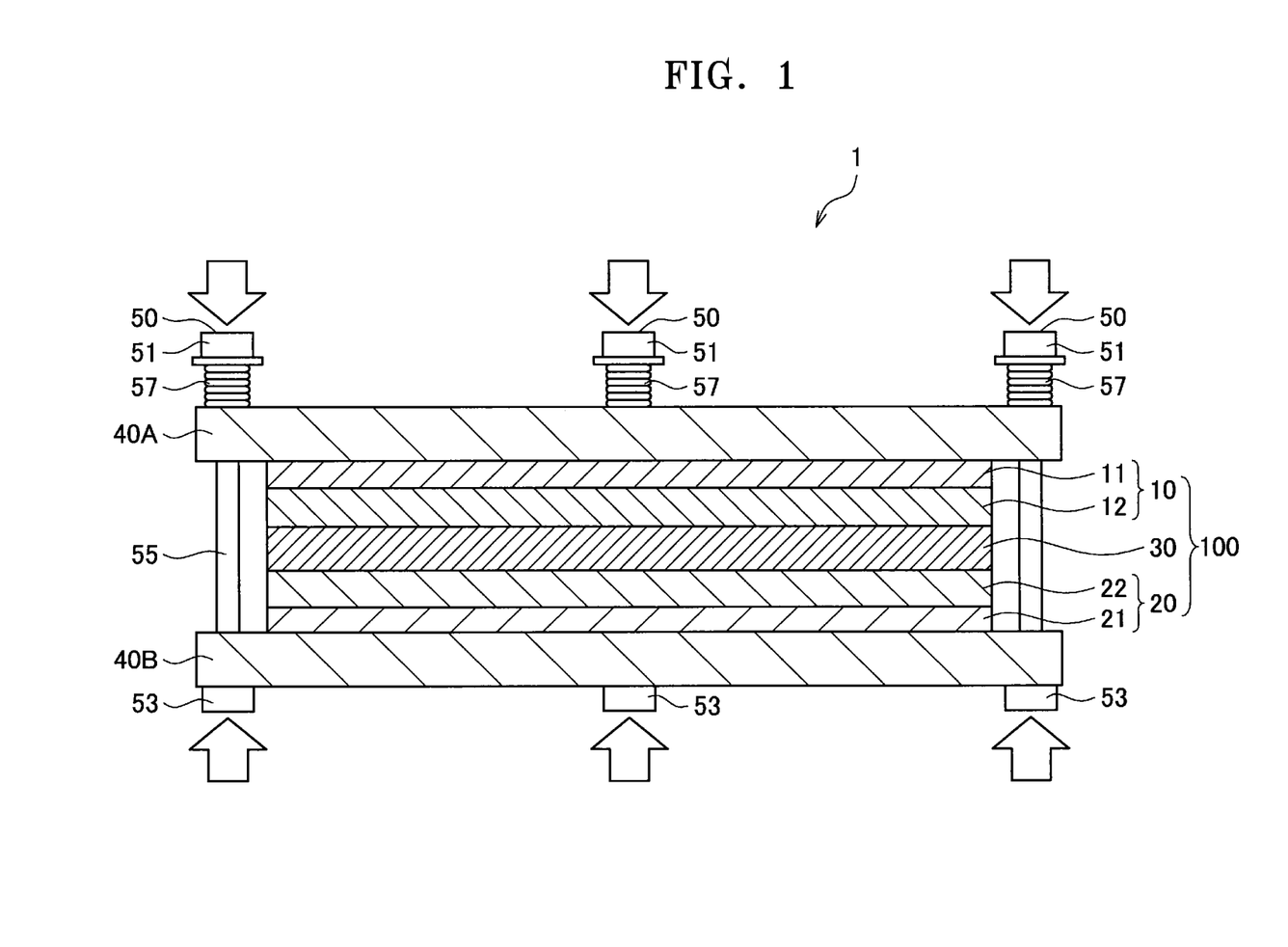
FIG. 1 is a cross-sectional view schematically illustrating a configuration of an all-solid secondary battery according to an embodiment of the present disclosure.
Figure 2:
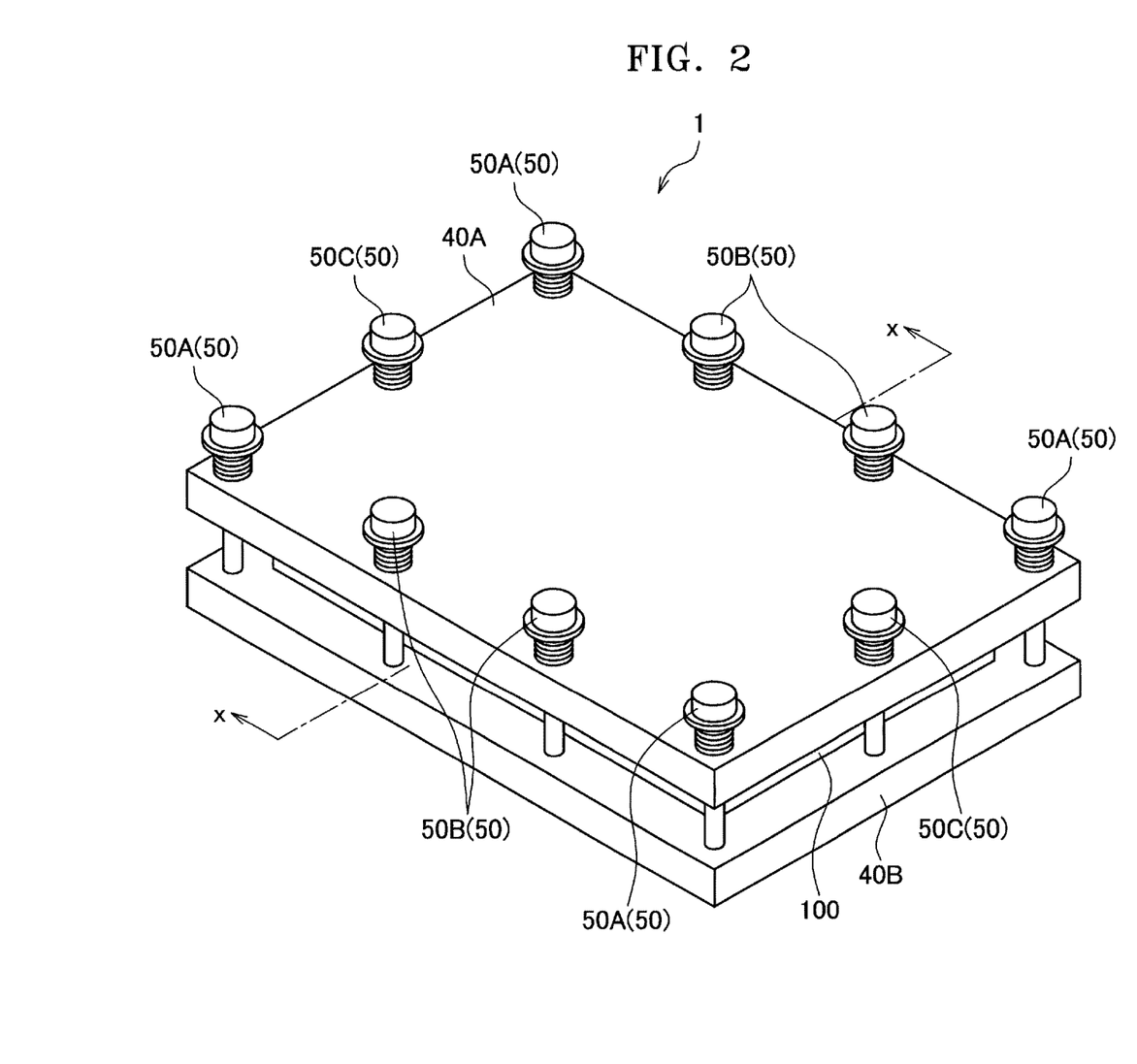
FIG. 2 is a perspective view illustrating the configuration of the all-solid secondary battery shown in FIG. 1.

Next, a configuration of an all-solid secondary battery 1 according to an embodiment will be described with reference to FIGS. 1 and 2. FIG. 1 is a cross-sectional view schematically illustrating a configuration of an all-solid secondary battery according to an embodiment, and FIG. 2 is a perspective view illustrating the entire configuration of the all-solid secondary battery shown in FIG. 1. Further, the cross-sectional view shown in FIG. 1 is a cross-sectional view of the all-solid secondary battery taken along the line x-x in FIG. 2.

As shown in FIGS. 1 and 2, an all-solid secondary battery 1 includes a cell 100, a pair of pressure applying members 40A and 40B applying a pressure to both (opposite) sides of the cell 100, and a plurality of pressure control members 50 controlling the pressure applied from the pair of pressure applying members 40A and 40B to the cell 100 for each portion of the cell 100.

The cell 100 is a laminate having a plate-like shape. As shown in FIG. 1, the cell 100 includes a positive electrode layer 10, a negative electrode layer 20, and a solid electrolyte layer 30. Thus the pair of pressure applying members 40A and 40B are on opposite sides of the solid electrolyte layer 30. The negative electrode layer 20 includes a negative electrode active material layer 22 including at least one of lithium metal and a lithium-containing alloy. The cell 100 will be described in further detail below.

The pressure applying members 40A and 40B are plate-shaped members disposed on both sides of the cell 100 and applying a pressure to both (opposite) sides of the battery cell 100, and in turn opposite sides of the solid electrolyte layer 30. Further, although it is shown in the drawing that the pressure applying members 40A and 40B are rectangular plates, the present embodiment is not limited thereto, and the pressure applying members 40A and 40B may have any suitable shape according to the use thereof.

Further, through-holes (not shown) are provided in the periphery of each of the pressure applying members 40A and 40B corresponding to the mounting sites of the pressure control members 50.

The pressure control members 50 control the pressure applied to the cell 100. As shown in FIG. 2, the pressure control members 50 are arranged along the periphery of each of the pressure applying members 40A and 40B. For example, the pressure control members 50A are disposed at the corners of each of the rectangular pressure applying members 40A and 40B. The pressure control members 50B are disposed at regular intervals between the two pressure control members 50A along the length direction of each of the pressure applying members 40A and 40B. The pressure control members 50C are disposed at regular intervals between the two pressure control members 50A along the width direction of each of the pressure applying members 40A and 40B.

As shown in FIG. 1, in an embodiment, each of the pressure control members 50 includes a nut 51, a bolt including a head 53 and a cylindrical portion 55, and an elastic member 57. In the bolt, the head 53 is disposed at the opposite side of the cell 100 with respect to the pressure applying member 40B, and the cylindrical portion 55 passes through the through-holes (not shown) of the pressure applying members 40A and 40B. The nut 51 is spirally engaged with a screw portion (not shown) in the vicinity of the end of the cylindrical portion 55 of the bolt to fix the pressure applying members 40A and 40b and the cell 100 together with the elastic member 57 and the bolt.

The elastic member 57 may be a coil spring, or a conical spring washer, for example, and is disposed between the nut 51 and the pressure applying member 40A. The cylindrical portion 55 of the bolt passes through the coil. The elastic member 57 generates a compression reaction force in accordance with the distance between the nut 51 and the pressure applying member 40A. Therefore, the elastic member 57 accelerates the pressure applying member 40A to apply a pressure to the cell 100 between the pressure applying members 40A and 40B in the arrow directions of FIG. 1. The intensity of the applied pressure may be adjusted by adjusting the distance between the nut 51 and the pressure applying member 40A. The elastic member 57 is not limited to a coil spring, and may be, for example, a member exhibiting elasticity in accordance with material properties of rubber or elastomer or a known spring member such as a leaf spring, a torsion bar, or a bamboo spring. Further, in the pressure control member 50, the member for fixing the elastic member 57 and the pressure control members 50A and 50B is not limited to the bolt and the nut 51, may be, for example, a rivet, a split pin, or a snap pin, which fixes and fastens the components having passed through the through-holes when pressure distribution is possible as will be described later. The bolt and the nut 51 are welded not to control the intensity of the applied pressure.

As described above, each of the pressure control members 50 controls the pressure applied to the cell 100 for each pressure application site. In an embodiment, the ratio $SD/P_{ave}$ of a standard deviation SD (in megapascals, MPa) in the pressure distribution of the pressure applied to the sites of the cell 100 to an average pressure $P_{ave}$ (MPa) applied to the cell 100 in a fully discharged state (depth of discharge 100% (100% DOD) is about 0.35 or less. The pressure distribution is determined based on the pressure applied to each pressure application site of the plurality of pressure application sites on the opposite sides of the cell 100.

Thus, it is possible to prevent a large amount of current to locally flow in the cell 100. Accordingly, it is possible to prevent a side effect from being generated in a region where a large amount of current flows or to prevent lithium from being locally precipitated, and it is possible to prevent a short circuit from occurring. Further, it is possible to prevent the separation between the respective layers and improve the performance of the cell 100, particularly, the cycle characteristics of the cell 100 by controlling a pressure applied to the cell 100.

In contrast, when the ratio $SD/P_{ave}$ is greater than about 0.35, a region where a large amount of current flows is easily formed, and the side reaction at the corresponding region and the local precipitation of lithium may not be suppressed. As a result, a short circuit more easily occurs. The ratio $SD/P_{ave}$ may be about 0.35 or less, for example, about 0.25 or less, e.g., about 0.01 to about 0.35, about 0.1 to about 0.25, or about 0.02 to about 0.2. The smaller ratios of $SD/P_{ave}$ are preferred. For example, the ratio $SD/P_{ave}$ may be about 0, which is good. It may be difficult to apply a pressure substantially uniformly at each site. In this case, the ratio $SD/P_{ave}$ may be, for example, about 0.15 or more.

Further, when a pressure is simply applied, the standard deviation SD (MPa) in the pressure distribution of the pressure applied to the cell 100 increases, and thus the range of the ratio $SD/P_{ave}$ may not be achieved. For example, as a general method of applying a pressure, first, there is exemplified a method of applying a pressure using the pressure control members 50A disposed in the vicinity of the corners of a rectangle formed by the pressure applying members 40A and 40B, or a method of uniformly applying a pressure to all the pressure control members 50. However, in this case, the pressure is intensified in the vicinity of the corners of the cell 100, so that the standard deviation SD (MPa) in the pressure distribution becomes greater. Therefore, in order to achieve the range of the ratio $SD/P_{ave}$, it may be desirable to weaken the energizing force of the pressure control members 50A at the corners of the pressure applying members 40A and 40B and to adjust the bias due to the pressure control members 50B and pressure control members 50C disposed in the vicinity of the edges of the pressure applying members 40A and 40B.

Further, the flatness of the surfaces of the pressure applying members 40A and 40B in contact with the cell 100 may also be controlled. For example, the pressure applying members used in the pressure application when employing a carbonaceous negative electrode active material in the related art do not have high flatness to such a degree that the short circuit of the negative electrode layer including lithium metal or a lithium-containing alloy may be prevented, so that the applied pressure is apt to be non-uniform. Therefore, the surfaces of the pressure applying members 40A and 40B in contact with the cell 100 may be polished several times to increase flatness.

Accordingly, considering these factors, the standard deviation SD (MPa) in the pressure distribution is decreased by precisely adjusting the pressure of each region or site, thereby achieving the above described range of the ratio $SD/P_{ave}$.

Further, in an embodiment, the average pressure $P_{ave}$ (MPa) applied to the cell 100 in a fully discharged state is greater than 0 MPa and 7.5 MPa or less. Thus, it is possible to prevent excessive pressure from being applied, and it is possible to sufficiently expand and contract the cell 100 according to charging and discharging. In contrast, when the average pressure $P_{ave}$ (MPa) is greater than 7.5 MPa, the cell 100 is excessively pressed, and thus the expansion and contraction of the cell 100 according to charging and discharging is not sufficient. As a result, battery performance, particularly, cycle characteristics may deteriorate. That is, the performance of the cell 100 is not improved by the application of pressure.

The average pressure $P_{ave}$ (MPa) applied to the cell 100 may be 7.5 MPa or less, for example, about 0.5 MPa to about 6.0 MPa, and for example, about 2.0 MPa to about 5.0 MPa. Thus, it is possible to further improve the characteristics of the cell 100, particularly, the cycle characteristics of the cell 100. Further, when the average pressure $P_{ave}$ (MPa) is within the above range, a suitable usable material, for example, stainless steel may be used as the material of the pressure applying members 40A and 40B.

Further, the distribution of the pressure applied to the battery cell 100 may be obtained by placing a pressure measuring film, for example, a press scale (Fuji Film Co., Ltd.) between the cell 100 and one of the pressure applying members 40A and 40B, applying a pressure, and then analyzing an image of the pressure measuring film. Further, the average pressure $P_{ave}$ (MPa) and the standard deviation SD (MPa) may also be calculated according to the obtained pressure distribution.

When the material and physical properties of the pressure applying members 40A and 40B are known, the pressure distribution may be estimated with relatively good accuracy even when the deflection of the pressure applying members 40A and 40B at the time of applying a pressure is measured.

Further, the materials constituting the pressure applying members 40A and 40B and the pressure control members 50 are not limited thereto, and may be, for example, known materials, for example, stainless steel, known alloys, and resin materials.

Next, the cell 100 is described.

The cell 100, as shown in FIG. 1, is sandwiched between the pressure applying members 40A and 40B, and includes a positive electrode layer 10, a negative electrode layer 20, and a solid electrolyte layer 30.

The positive electrode layer 10 includes a positive electrode current collector 11 and a positive electrode active material layer 12. The positive electrode current collector 11 may be, for example, a plate or foil including indium (In), copper (Cu), magnesium (Mg), stainless steel, titanium (Ti), iron (Fe), cobalt (Co), nickel (Ni), zinc (Zn), aluminum (Al), germanium (Ge), lithium (Li), a combination thereof, or an alloy thereof. The positive electrode current collector 11 may be omitted in some embodiments. The positive electrode current collector 11 may be connected to a wiring through a terminal (not shown).

The positive electrode active material layer 12 may include a positive electrode active material and a solid electrolyte. The solid electrolyte included in the positive electrode layer 10 may be the same as or different from the solid electrolyte included in the solid electrolyte layer 30. Details of the solid electrolyte will be described in the section of the solid electrolyte layer 30.

The positive electrode active material may be a positive electrode active material capable of reversibly incorporating and deincorporating lithium ions.

Examples of the positive electrode active material include a composite oxide of lithium or a lithium compound such as lithium cobalt oxide (LCO), lithium nickel oxide, lithium nickel cobalt oxide, lithium nickel cobalt aluminum oxide (NCA), lithium nickel cobalt manganese oxide (NCM), lithium manganate, and lithium iron phosphate, nickel sulfide, copper sulfide, sulfur, iron oxide, vanadium oxide, or a combination thereof. These positive electrode active materials may be used alone or in combination.

Further, the positive electrode active material layer may include a lithium compound having a layered rock-salt (e.g., rock-salt type) structure. The lithium compound having a layered rock-salt structure may include Li and Ni, Co, Mn, Al, or a combination thereof. The term "layered" as used herein refers to the configuration of the layered arrangement of the atoms in the structure of the lithium compound. Further, the term "rock-salt structure" as used herein refers to a sodium chloride-type structure, in which the cations and anions form separate interpenetrating face-centered cubic lattices shifted by ½ of a unit cell dimension.

Examples of the lithium compound is a transition metal oxide having such a layered rock-salt structure, e.g., a ternary transition metal oxides such as $LiNi_xCo_yAl_zO_2$ (NCA) or $LiNi_xCo_yMn_zO_2$ (NCM), where for each of NCA and NCM, x, y, and z are determined independently and $0<x<1$, $0<y<1$, $0<z<1$, and $x+y+z=1$.

A combination comprising at least one of the foregoing positive electrode active materials may also be used.

When the positive electrode active material includes a lithium transition metal oxide having a layered rock-salt structure, the positive electrode active material may have a relatively high charge-discharge voltage, and the energy density and thermal stability of the all-solid secondary battery may be improved.

The positive electrode active material may include a coating layer. In one or more embodiments, the coating layer may cover a portion of the surface of the positive electrode active material or may cover the entire surface. The coating layer may be in the shape of a continuous layer or may be present as independent and/or interconnected islands on the surface of the positive electrode active material. In some embodiments, the coating layer may include a coating element compound selected from at least one of oxide, hydroxide, oxyhydroxide, oxycarbonate, and hydroxycarbonate of the coating element. In some embodiments, the coating layer may be amorphous or crystalline. In some embodiments, the coating element included in the coating layer may include lithium (Li), magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a combination thereof For example, the coating layer may be formed of $Li_2ZrO_3$. The coating layer may be formed using any method that does not adversely affect the physical properties of the positive electrode active material when a compound of the coating element is used, for example, a spray coating method or a dipping method. The coating method may be determined by one of skill in the art without undue experimentation, and thus a detailed description thereof is omitted.

In an embodiment, the positive electrode active material may be composed of (e.g., comprise, consist essentially of, or consist of) the lithium salt of the ternary transition metal oxide, such as NCA or NCM. When nickel (Ni) is included in the positive electrode active material, the capacity and energy density of the all-solid secondary battery may be increased, and thus the metal elution from the positive electrode active material in the charged state may be reduced. As a result, the long-term stability and cycle characteristics of the all-solid secondary battery according to an embodiment may be improved in the charged state.

The positive electrode active material may have, for example, a spherical particle shape, such as a circular or elliptical particle shape, an oval shape, or a combination thereof. The particle size of the positive electrode active material is not particularly limited, and may be in a range applicable to the positive electrode active material of the all-solid secondary battery in the related art. The amount of the positive electrode active material in the positive electrode active material layer is not particularly limited, and may be in a range applicable to the positive electrode active material layer of the all-solid secondary battery in the related art.

In addition to the above-described positive electrode active material and solid electrolyte, additives such as a conductive agent, a binder, a filler, and a dispersant may be appropriately combined with the positive electrode active material layer.

Examples of the conductive agent in the positive electrode active material layer may include, for example, graphite, carbon black, acetylene black, Ketjen black, carbon fiber, metal powder, or a combination thereof. Examples of the binder that may be combined with the positive electrode active material layer may include styrene-butadiene rubber (SBR), polytetrafluoroethylene, polyvinylidene fluoride, polyethylene oxide, or a combination thereof. As the filler, dispersant, and ion conductive agent that may be combined with the positive electrode layer, known materials generally used in electrodes of lithium ion secondary batteries may be used.

When the positive electrode active material layer includes a positive electrode active material, a solid electrolyte, and a binder, the cell charge capacity (capacity per unit cell) of the all-solid secondary battery may increase.

Further, the density ratio of the positive electrode active material layer 12 may be 60% or greater. In this case, the battery characteristics of the all-solid secondary battery are improved. Here, the density ratio of the positive electrode active material layer is a ratio of volume density (i.e., packing density) to true density of the positive electrode active material layer. The true density of the positive electrode active material layer is calculated in accordance with the nominal density of each material constituting the positive electrode active material layer and the mass ratio of each such material, i.e., excluding open and closed pores. The volume density or packing density includes open and closed pores, for example. Moreover, the cross-section of the positive electrode active material layer is observed with an SEM to measure the filling rate of the positive electrode active material layer, and the filling rate may be set to a density ratio.

In contrast, when the density ratio of the positive electrode active material layer may be less than 0.6 (i.e., volume density/true density), sufficient lithium conductivity and electron conductivity may not be obtained, and battery characteristics deteriorate. The density ratio of the positive electrode active material layer may be about 0.6 or more, or about 0.7 or more, and for example, about 0.8 or more, e.g., about 0.6 to about 0.95, or about 0.65 to about 0.9.

Although the upper limit of the density ratio is not particularly limited, the upper limit thereof may be, for example, 0.95 or less when the positive electrode active material is a crystalline material such as a lithium salt of transition metal oxide. When the density ratio is greater than 0.95, the positive electrode active material layer may be cracked. When the positive electrode active material layer is cracked, battery characteristics may deteriorate. Further, when the positive electrode active material is a crystalline material such as sulfur, due to constraint on the performance of a manufacturing apparatus, the density ratio may be less than 1, and may also be less than 0.995.

The negative electrode layer 20 may include a negative electrode current collector 21 and a negative electrode active material layer 22. The negative electrode current collector 21 may be a plate or foil including, for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), an alloy thereof, or a combination thereof. The negative electrode current collector 21 may be omitted in some embodiments.

The negative electrode active material layer 22 includes lithium metal or a lithium-containing alloy. The negative electrode active material layer 22 may consist of lithium metal, or may comprise an alloy of lithium and another metal active material such as indium (In), aluminum (Al), tin (Sn), silicon (Si), or a combination thereof. The negative electrode active material layer 22 may be a lithium metal layer made of only lithium metal. Thus, the energy density of the all-solid secondary battery 1 may be improved.

Further, in an embodiment, the negative electrode layer 20 may be connected to a wiring through a terminal (not shown).

The solid electrolyte layer 30 is disposed between the positive electrode layer 10 and the negative electrode layer 20, and may include a solid electrolyte.

The solid electrolyte may include, for example, a sulfide-based solid electrolyte material including at least sulfur (S), phosphorous (P), and lithium (Li). Examples of the sulfide-based solid electrolyte material may include $aLi_2S$-$(1-a)P_2S_5$ wherein $0<a<1$, $aLi_2S$-$bP_2S_5$-$cLiX$ (where X is a halogen atom, e.g., F, Cl, Br, I, or a combination thereof, wherein $0<a<1$, $0<b<1$, $0<c<1$, and $a+b+c=1$, $aLi_2S$-$bP_2S_5$-$cLi_2O$ wherein $0<a<1$, $0<b<1$, $0<c<1$, and $a+b+c=1$, $aLi_2S$-$bP_2S_5$-$cLi_2O$-$dLiI$ wherein $0<a<1$, $0<b<1$, $0<c<1$, $0<d<1$ and $a+b+c+d=1$, $aLi_2S$-$(1-a)SiS_2$ wherein $0<a<1$, $aLi2_S$-$bSiS_2$-$cLiI$ $0<a<1$, $0<b<1$, $0<c<1$, and $a+b+c=1$, $aLi_2S$-$bSiS_2$-$cLiBr$ wherein $0<a<1$, $0<b<1$, $0<c<1$, and $a+b+c=1$, $aLi_2S$-$bSiS_2$-$cLiCl$ wherein $0<a<1$, $0<b<1$, $0<c<1$, and $a+b+c=1$, $aLi_2S$-$bSiS_2$-$cB_2S_3$-$dLiI$ wherein $0<a<1$, $0<b<1$, $0<c<1$, $0<d<1$ and $a+b+c+d=1$, $aLi_2S$-$bSiS_2$-$cP_2S_5$-$dLiI$ wherein $0<a<1$, $0<b<1$, $0<c<1$, $0<d<1$ and $a+b+c+d=1$, $aLi_2S$-$(1-a)B_2S_3$ wherein $0<a<1$, $aLi_2S$-$bP_2S_5$-$cZ_mS_n$ (where m and n are each independently positive integers between 1 and 10, Z is Ge, Zn, or Ga, and wherein $0<a<1$, $0<b<1$, $0<c<1$, and $a+b+c=1$), $aLi_2S$-$(1-a)GeS_2$ wherein $0<a<1$, $aLi_2S$-$bSiS_2$-$cLi_3PO_4$ wherein $0<a<1$, $0<b<1$, $0<c<1$, and $a+b+c=1$, and $aLi_2S$-$bSiS_2$-$cLi_pMO_q$ (where p and q are each independently positive integers between 1 and 10, wherein $0<a<1$, $0<b<1$, $0<c<1$, and $a+b+c=1$ and M may be P, Si, Ge, B, Al, Ga or In), or a combination thereof. The sulfide-based solid electrolyte materials may be prepared by treating a starting material (for example, $Li_2S$, $P_2S_5$, etc.) by a melt quenching method or a mechanical milling method. After this treatment, additional heat treatment may be performed. The solid electrolyte may be amorphous or crystalline, and may also be a mixed form thereof.

As the solid electrolyte, a material including at least one selected from sulfur (S), silicon (Si), phosphorus (P), and boron (B) is preferred. As a result, the lithium ion conductivity of the solid electrolyte layer may be improved, and the battery characteristics of the all-solid secondary battery 1 may be improved. In particular, as the solid electrolyte, it is preferable to use a solid electrolyte containing at least sulfur (S), phosphorus (P) and lithium (Li) as components, and more preferable to use a solid electrolyte containing $Li_2S$—$P_2S_5$.

In an embodiment, when a solid electrolyte material including $Li_2S$—$P_2S_5$ is used as the sulfide-based solid electrolyte material of the solid electrolyte, the mixing molar ratio of $Li_2S$ and $P_2S_5$ may be selected, for example, in the range of 50:50 to 90:10.

The solid electrolyte layer may further include a binder. Examples of the binder included in the solid electrolyte layer may include styrene-butadiene rubber (SBR), polytetrafluoroethylene, polyvinylidene fluoride, and polyethylene oxide. The binder included in the solid electrolyte layer may be the same as or different from the binder included in the positive electrode active material layer.

The density ratio of the solid electrolyte layer (i.e., volume density/true density) may be about 0.6 or greater. In this case, the gaps in the solid electrolyte layer become smaller and less frequent. Therefore, the occurrence of a short circuit becomes difficult. Here, the density ratio of the solid electrolyte layer is a ratio of volume density to true density of the solid electrolyte layer. The true density of the solid electrolyte layer may be calculated based on the nominal density of each material constituting the solid electrolyte layer and the mass ratio of each material, and the cross-section of the solid electrolyte layer is observed with a scanning electron microscope (SEM) to measure the filling rate of the solid electrolyte layer, and the filling rate may be set to a density ratio.

In contrast, when the density ratio of the solid electrolyte layer is less than about 0.6, gaps are easily formed in the solid electrolyte layer. Lithium metal is readily precipitated in the gaps. As a result, a short circuit is easier to occur. The density ratio of the solid electrolyte layer 0 may be about 0.6 or more, for example, about 0.75 or more, and for example, about 0.9 or more, e.g., about 0.6 to about 0.95, or about 0.65 to about 0.9. Although the upper limit of the density ratio is not particularly limited, the upper limit thereof may be less than 1 or 0.995 or less due to constraint on the performance of a manufacturing apparatus.

Further, the average thickness of the solid electrolyte layer is not particularly limited, but may be, for example, about 50 micrometers (μm) to about 200 μm. Further, the average thickness of the solid electrolyte layer may be, for example, about 50 μm to about 100 μm.

As such, when the solid electrolyte layer is comparatively thin, a short circuit easily occurs when a pressure is applied, but in an embodiment, a short circuit can be prevented. In an embodiment, such a comparatively thin solid electrolyte layer may be suitably used.

Further, if desirable, the cell 100 may be sealed with a resin film or an aluminum laminate film. Thus, the cell 100 may be electrically insulated from external environments. Further, the deterioration of the cell 100 due to external environments may be prevented.

The area of the cross-section of the cell 100 is not particularly limited, but may be about 1 square centimeters ($cm^2$) to about 1500 $cm^2$. In a small cell it is relatively easy to apply a uniform pressure to the entire battery. In a practical capacity cell having a larger area, it is not easy to apply a uniform pressure. In particular, when the area thereof is 20 $cm^2$ or greater, it is difficult to apply a uniform pressure to a cell known in the related art. Accordingly, when the corresponding area is 20 $cm^2$ or greater, the effects according to the present disclosure may be more remarkably obtained. Further, when the areas of the respective layers constituting the cell 100 are different from each other, the area of the positive electrode active material layer 12 may be set to the area of the cell 100.

The above-described all-solid secondary battery is configured such that the pressure of each region or site is uniform depending on the applied pressure. Therefore, the intensity of the current flowing through the cell becomes uniform at each region or site. Further, since the expansion and contraction at each region or site of the cell occurs uniformly, solid-solid interface delamination of each layer is prevented. As a result, the battery performance of the all-solid secondary battery, particularly, the charge-discharge cycle characteristics of the all-solid secondary battery are improved.

A method of manufacturing the all-solid secondary battery 1 according to an embodiment will be further described. The all-solid secondary battery 1 according to an embodiment is manufactured by fabricating a cell 100 and then inserting and fixing the cell 100 between the pressure applying members 40A and 40B.

The cell 100 may be fabricated by respectively forming a positive electrode layer 10, a negative electrode layer 20, and a solid electrolyte layer 30 and then laminating these respective layers together. The positive electrode layer 10, the negative electrode layer 20, and the solid electrolyte layer 30 may be formed by a known method and without undue experimentation.

A positive electrode active material may be prepared by a known method. Subsequently, the prepared positive electrode active material is mixed with a solid electrolyte material prepared by a method to be described later and various additives, and this mixture dissolved in a nonpolar solvent to form a slurry or paste. The obtained slurry or paste is applied onto a positive electrode current collector 11, dried, and then roll-pressed to obtain a positive electrode layer 10. The positive electrode layer 10 may be formed by compression-molding the mixture of a positive electrode active material and various additives in the form of pellet without using the positive electrode current collector 11. Further, in order to increase the density ratio of a positive electrode active material layer 12, a press process such as roll press may be performed.

A negative electrode layer 20 is formed by laminating a metal foil (including lithium metal or a lithium-containing alloy), as a negative electrode active material layer 22, on a negative electrode current collector 21.

A solid electrolyte layer may be formed of a solid electrolyte obtained from a sulfide-based solid electrolyte material.

First, starting materials are treated by melt quenching or mechanical milling.

For example, when melt quenching is used, a predetermined amount of starting materials (for example, $Li_2S$, $P_2S_5$, or the like) are mixed in the form of pellet, reacted at a predetermined reaction temperature in vacuum, and then quenched to obtain a sulfide-based solid electrolyte material. The reaction temperature of the mixture of $Li_2S$ and $P_2S_5$ may be about 400° C. to about 1000° C., for example, about 800° C. to about 900° C. Further, reaction time may be about 0.1 hours to about 12 hours, for example, about 1 hour to about 12 hours. Further, the cooling temperature of the reaction product is generally about 10° C. or lower, for example, about 0° C. or lower, and the cooling rate of the reaction product may be generally about 1° C. per second (° C./sec) to about 10,000° C./sec, for example, 1° C./sec to about 1,000° C./sec.

Further, when mechanical milling is used, starting materials (for example, $Li_2S$, $P_2S_5$, or the like) are stirred and reacted using ball mill or the like to obtain a sulfide-based solid electrolyte material. In the mechanical milling, stirring speed and stirring time are particularly limited. The faster the stirring speed, the faster the production rate of the sulfide-based solid electrolyte material, and the longer the stirring time, the higher the conversion rate of the starting material to the sulfide-based solid electrolyte material.

Thereafter, the mixed raw materials obtained by melt quenching or mechanical milling are heat-treated at a predetermined temperature, and then pulverized to obtain a particulate solid electrolyte. When the solid electrolyte has a glass transition point, the solid electrolyte may be converted from an amorphous solid electrolyte to a crystalline solid electrolyte by heat treatment.

Subsequently, the solid electrolyte obtained by the above method is formed into a film by a known film forming method, for example, aerosol deposition, cold spraying, or sputtering, thereby forming a solid electrolyte layer 30. Further, the solid electrolyte layer 30 may be formed by pressing solid electrolyte particles. Moreover, the solid electrolyte layer 30 may be formed by applying, drying, and pressing a mixture of a solid electrolyte, a solvent, and a binder. Meanwhile, in order to increase the density ratio of the solid electrolyte layer 30, a press process such as roll press may be performed.

Subsequently, the positive electrode active material layer 12 (that is, the positive electrode layer 10), the solid electrolyte layer 30, and the negative electrode active material layer 22 (that is, the negative electrode layer 20) are laminated together to fabricate an electrode laminate. Subsequently, the electrode laminate is pressed. By the above processes, a cell 100 is manufactured. The specific pressing method is not particularly limited, and may be a pressing method used for manufacturing an all-solid secondary battery in the related art. For example, pressing such as roll pressing may be performed.

Subsequently, pressure applying members 40A and 40B are disposed on both (opposite) sides of the cell 100, and are fixed to the cell 100 by pressure control members 50.

Subsequently, the intensity and distribution of the pressure applied to both sides of the cell 100 by the pressure control members 50 are adjusted. The adjustment of the intensity and distribution of the pressure may be performed by the setting of the pressure control members 50 (for example, a state in the case of a spiral shape). Further, the adjustment of the intensity and distribution of the pressure may also be performed by changing the setting of the pressure control members 50 while measuring a pressure distribution using the above-described pressure measuring film or strain gauge.

In this way, the all-solid secondary battery 1 may be manufactured.

Hereinafter, the present disclosure will be described in more detail with reference to the following examples. However, these embodiments are set forth to illustrate the present disclosure, and the scope of the present disclosure is not limited thereto.

EXAMPLES

Example 1

Preparation of Positive Electrode Structure

Three-component powder of $LiNi_{0.8}Co_{0.15}Al_{0.05}O_2$ (NCA) as a positive electrode active material, amorphous powder of $Li_2S$—$P_2S_5$ (molar ratio of 80:20) as a sulfide-based solid electrolyte, and vapor-grown carbon fiber powder as a positive layer conducting material (conducting agent) were measured at a weight ratio of 60:35:5, and mixed using a revolving mixer.

Next, a dehydrated xylene solution in which SBR was dissolved as a binder was added to this mixed powder such that the content of SBR is 5.0 wt % with respect to the total weight of the mixed powder, so as to obtain a primary mixture. Further, a suitable amount of dehydrated xylene for viscosity adjustment was added to the obtained primary mixture to produce a secondary mixture. Moreover, in order to improve the dispersibility of the mixed powder, zirconia balls having a diameter 5 mm was added to the secondary mixture such that the volume of each of space, mixed powder, and zirconia balls is ⅓ of the total volume of a kneading container, so as to obtain a tertiary mixture. The tertiary mixture obtained in this way was put into a revolving mixer, and stirred at 3,000 rpm for 3 minutes, so as to obtain a coating solution for a positive electrode active material layer.

Subsequently, an aluminum foil current collector having a thickness of 20 µm was provided as a positive electrode current collector and disposed in a desktop screen printing press, the aluminum foil current collector was coated with the coating solution for a positive electrode active material layer, and then the aluminum foil current collector coated with the coating solution was dried by a hot plate at 60° C. for 30 minutes. Subsequently, the coated aluminum foil current collector was also vacuum-dried at 80° C. for 12 hours. Thus, positive electrode active material layers were formed on the positive electrode current collector to obtain a positive electrode structure. The total thickness of the positive electrode structure after drying was about 165 µm.

Formation of Solid Electrolyte Layer

A dehydrated xylene solution in which SBR was dissolved was added to amorphous powder of $Li_2S$—$P_2S_5$ (molar ratio of 80:20) as a sulfide-based solid electrolyte such that the content of SBR is 2.0 wt % with respect to the total weight of the mixed powder, so as to obtain a primary mixture. Further, a suitable amount of dehydrated xylene for viscosity adjustment was added to the obtained primary mixture to produce a secondary mixture. Moreover, in order to improve the dispersibility of the mixed powder, zirconia balls having a diameter 5 mm was added to the secondary mixture such that the volume of each of space, mixed powder, and zirconia balls is ⅓ of the total volume of a kneading container, so as to obtain a tertiary mixture. The tertiary mixture obtained in this way was put into a revolving mixer, and stirred at 3,000 rpm for 3 minutes, so as to obtain a coating solution for an electrolyte layer.

A polyethylene terephthalate substrate (PET substrate) was placed in a tabletop screen printing machine, and the coating solution for an electrolyte layer was applied onto the PET substrate using a metal mask having a thickness of 300 µm. Then, the PET substrate coated with the coating solution was dried at 40° C. for 10 minutes by a hot plate and then further dried at 40° C. for 12 hours in vacuum to form a solid electrolyte layer. The total thickness of the solid electrolyte layer after drying was about 180 µm.

Fabrication of Negative Electrode Structure

A nickel foil current collector having a thickness of 20 µm was provided as a negative electrode current collector. A lithium metal foil having a thickness of 30 µm was attached to such a negative electrode current collector to fabricate a negative electrode structure.

Fabrication of Cell

The positive electrode structure was cut by a Thomson knife, adhered to the PET substrate such that the solid electrolyte layer faces the positive electrode active material layer of the positive electrode structure, and then the solid electrolyte layer and the positive electrode active material layer were attached to each other using a roll press machine having a roll interval of 150 µm according to a dry lamination method, so as to obtain a laminate. Subsequently, the laminate was pressed at a pressure of 150 MPa by a press machine. After pressing, the volume density of the positive electrode active material layer was 2.3 grams per cubic centimeter (g/cc), and the volume density of the solid electrolyte layer was 1.3 g/cc. Further, the thickness of the solid electrolyte layer was 90 µm. Further, the area of the positive electrode structure having the positive electrode active material layer and the positive electrode current collector was 20 $cm^2$.

Subsequently, the negative electrode structure was cut by a Thomson knife, a lithium foil of the negative electrode structure was attached to the surface of the solid electrolyte layer of the laminate, and pressing was performed at a pressure of 50 MPa by a press machine, so as to fabricate an all-solid secondary battery (test cell) in which the positive electrode layer, the solid electrolyte layer, and the negative electrode layer derived from the negative electrode structure are laminated.

The fabricated single cell was put into an aluminum laminate film provided with a terminal, and evacuated to a vacuum of 100 Pa by a vacuum generator, followed by heat sealing.

Manufacture of all-Solid Secondary Battery

A cell was disposed between metal plates as pressure applying members, and the metal plates were engaged with a pressure control member by a screw provided with a plate spring through holes formed in the metal plates such that the relationship $SD/P_{ave}$ between the average value $P_{ave}$ of the pressure applied to the battery cell and the standard deviation SD of the pressure was 0.35 and the average value $P_{ave}$ of the pressure applied to the battery cell was 3.0 MPa. Thus, an all-solid secondary battery according to Example 1 was obtained.

In the all-solid secondary battery according to Example 1, the density ratios of the solid electrolyte layer and the positive electrode active material layer and the distribution of the pressure applied to the battery cell were measured and calculated as follows.

Calculation of Density Ratios of Positive Electrode Active Material Layer and Solid Electrolyte Layer The nominal densities of NCA, amorphous powder of $Li_2S$—$P_2S_5$ (80:20 molar ratio), and a conducting agent was 4.6 g/cc, 1.8 g/cc, 2.1 g/cc, respectively. Therefore, the true density of the positive electrode active material layer was 3.5 g/cc (i.e., the true density is calculated as $(4.6 \times 0.6) + (1.8 \times 0.35) + (2.1 \times 0.05) = 3.5$), and the ratio of the volume density of the positive electrode active material layer to the true density of the positive electrode active material layer was 0.66 (=2.3/3.5). Further, the ratio of the volume density of the solid electrolyte layer to the true density of the solid electrolyte layer was 0.72 (=1.3/1.8).

Pressure Distribution Measurement

A press scale (manufactured by Fuji Film Co., Ltd.) was inserted between the metal plate and the battery cell, and screwing was performed under various engaging conditions. Then, after unscrewing was performed and the press scale was extracted, the pressure at each point was read using a pressure image analysis system FPD-8010J (manufactured by Fuji Film Co., Ltd.), and the average value $P_{ave}$ of the pressure applied to the battery cell and the standard deviation SD of the pressure were calculated.

Examples 2 to 5

All-solid secondary batteries according to Examples 2 to 5 were manufactured in the same manner as in Example 1, except that the average value $P_{ave}$ of the pressure applied to the battery cell were 0.5 MPa, 1.0 MPa, 2.0 MPa, and 6.0 MPa, respectively.

Example 6

An all-solid secondary battery according to Example 6 was manufactured in the same manner as in Example 1, except that the relationship $SD/P_{ave}$ between the average value $P_{ave}$ of the pressure applied to the cell and the standard deviation SD of the pressure was adjusted to 0.25.

Example 7

An all-solid secondary battery according to Example 7 was manufactured in the same manner as in Example 1, except that the relationship $SD/P_{ave}$ between the average value $P_{ave}$ of the pressure applied to the battery cell and the standard deviation SD of the pressure was adjusted to 0.15.

Comparative Example 1

An all-solid secondary battery according to Comparative Example 1 was manufactured in the same manner as in Example 1, except that the relationship $SD/P_{ave}$ between the average value $P_{ave}$ of the pressure applied to the battery cell and the standard deviation SD of the pressure was adjusted to 0.45.

Comparative Example 2

An all-solid secondary battery according to Comparative Example 2 was manufactured in the same manner as in Example 1, except that the average value $P_{ave}$ of the pressure applied to the cell was 8.0 MPa.

Comparative Example 3

An all-solid secondary battery according to Comparative Example 3 was manufactured in the same manner as in Example 1, except that the volume density of the positive electrode active material layer was 1.6 g/cc, and the ratio of the volume density to the true density was 0.46 (=1.6/3.5).

Comparative Example 4

An all-solid secondary battery according to Comparative Example 4 was manufactured in the same manner as in Example 1, except that the volume density of the positive electrode active material layer was 0.9 g/cc, and the ratio of the volume density to the true density was 0.5 (=0.9/1.8).

Evaluation of Cycle Characteristics

The charge-discharge cycle characteristics of the all-solid secondary batteries according to Examples 1 to 7 and Comparative Examples 1 to 4 were evaluated as follows.

With respect to each of the all-solid secondary batteries according to Examples 1 to 7 and Comparative Examples 1 to 4, the charging and discharging cycle of charging the battery up to a maximum voltage of 4.0 V at a constant current of 0.05 C at 45° C. and discharging the battery to a discharge end voltage of 2.5 V at a constant current of 0.05 C was repeated for 50 cycles. The ratio of discharge capacity at the 50th cycle to discharge capacity at the first cycle was defined as a retention of discharge capacity. The retention of discharge capacity is a parameter representing cycle characteristics. The larger the value of the retention, the better the cycle characteristics. The characteristics and evaluation results of Examples 1 to 7 and Comparative Examples 1 to 4 are summarized in Table 1.

TABLE 1

| | | | Volume density | | Ratio of density to true density | | | |
| --- | --- | --- | --- | --- | --- | --- | --- | --- |
| | $SD/P_{ave}$ | $P_{ave}$ (MPa) | Positive electrode active material layer (g/cc) | Solid electrolyte layer (g/cc) | Positive electrode active material layer | Solid electrolyte layer | Thickness of solid electrolyte layer (μm) | Capacity Retention after 50 cycles |
| Example 1 | 0.35 | 3.0 | 2.3 | 1.3 | 0.66 | 0.72 | 90 | 88% |
| Example 2 | 0.35 | 0.5 | 2.3 | 1.3 | 0.66 | 0.72 | 90 | 82% |
| Example 3 | 0.35 | 1.0 | 2.3 | 1.3 | 0.66 | 0.72 | 90 | 84% |
| Example 4 | 0.35 | 2.0 | 2.3 | 1.3 | 0.66 | 0.72 | 90 | 87% |
| Example 5 | 0.35 | 6.0 | 2.3 | 1.3 | 0.66 | 0.72 | 90 | 87% |
| Example 6 | 0.25 | 3.0 | 2.3 | 1.3 | 0.66 | 0.72 | 90 | 92% |
| Example 7 | 0.15 | 3.0 | 2.3 | 1.3 | 0.66 | 0.72 | 90 | 92% |
| Comparative Example 1 | 0.45 | 3.0 | 2.3 | 1.3 | 0.66 | 0.72 | 90 | Short circuit at $16^{th}$ cycle |
| Comparative Example 2 | 0.35 | 8.0 | 2.3 | 1.3 | 0.66 | 0.72 | 90 | Short circuit at $12^{th}$ cycle |
| Comparative Example 3 | 0.35 | 3.0 | 1.6 | 1.3 | 0.46 | 0.72 | 90 | 58% |
| Comparative Example 4 | 0.35 | 3.0 | 2.3 | 0.9 | 0.66 | 0.50 | 90 | Short circuit at $21^{st}$ cycle |

As given in Table 1, the all-solid secondary batteries of Examples 1 to 7 had excellent cycle characteristics. In particular, when SD/P$_{ave}$ is 0.25 or less, cycle characteristics were further improved. Further, when P$_{ave}$ (MPa) is 3.0 MPa or higher, cycle characteristics were further improved.

In contrast, the all-solid secondary batteries of Comparative Examples 1 to 4 were short-circuited in a relatively short cycle, or were inferior in cycle characteristics (battery performance). The all-solid battery of Comparative Example 1 had a large SD/P$_{ave}$, and thus a charge/discharge reaction was non-uniform at each site, resulting in a short circuit in a relatively fast cycle. Further, the all-solid battery of Comparative Example 2 had an excessively large average pressure P$_{ave}$ (MPa), and the expansion and contraction thereof due to charging and discharging were not sufficient, resulting in occurrence of precipitation of lithium metal and occurrence of cracks of a solid electrolyte layer, so that a short circuit occurred in a relatively fast cycle.

In the all-solid secondary battery of Comparative Example 3, the density ratio of a positive electrode active material layer is excessively small, and thus electron conductivity and lithium ion conductivity is insufficient, thereby deteriorating battery characteristics including cycle characteristics. In the all-solid secondary battery of Comparative Example 4, the density ratio of a solid electrolyte layer is excessively small, and the precipitated lithium metal penetrates the solid electrolyte layer to cause a short circuit.

As described above, according to the present disclosure, when a negative electrode active material layer includes lithium metal or a lithium-containing alloy, a short circuit can be prevented even when pressure is applied.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. An all-solid secondary battery, comprising:
    a cell comprising:
        a positive electrode active material layer comprising a lithium transition metal oxide comprising layered rock-salt-type structure and a solid electrolyte,
        a negative electrode active material layer comprising at least one of lithium metal and a lithium-containing alloy, and
        a solid electrolyte layer disposed between the positive electrode active material layer and the negative electrode active material layer, wherein the solid electrolyte layer comprises a sulfide solid electrolyte material;
    a pair of pressure applying members disposed on opposite sides of the cell and configured to apply a pressure to the opposite sides of the cell; and
    a plurality of pressure control members disposed at a periphery of each of the pressure applying members configured to control the pressure applied by the pair of pressure applying members,
    wherein a ratio of volume density to true density of the positive electrode active material layer is about 0.6 or greater,
    wherein a ratio of volume density to true density of the solid electrolyte layer is about 0.6 or greater,
    wherein an average pressure applied to the opposite sides of the cell in a fully discharged state is about 0.5 megapascals to about 6.0 megapascals,
    wherein a ratio of a standard deviation of a pressure distribution of the pressure applied to the opposite sides of the cell to the average pressure applied to the opposite sides of the cell in the fully discharged state, is about 0.35 or less, and
    wherein the all-solid secondary battery is configured to has a capacity retention of greater than or equal to 84 percent after 50 cycles of charging and discharging at a temperature of 45° C. under a charge current 0.05 C, a discharge current of 0.05 C, and an operating voltage of 2.5 volts to 4 volts.

2. The all-solid secondary battery of claim 1, wherein the ratio of the standard deviation of the pressure distribution to the average pressure applied to the opposite sides of the cell is about 0.15 to about 0.25.

3. The all-solid secondary battery of claim 1, wherein the positive electrode active material layer comprises a compound represented by the formula LiNixCoyAlzO$_2$, wherein 0≤x≤1, 0<y<1, 0<z<1, and x+y+z=1, or LiNix'Coy'Mnz'O2 wherein 0≤x'≤1, 0<y'<1, 0<z'<1, and x'+y'+z'=1.

4. The all-solid secondary battery of claim 1, wherein the positive electrode active material layer further comprises a binder.

5. The all-solid secondary battery of claim 4, wherein the binder comprises styrene-butadiene rubber, polytetrafluoroethylene, poly(vinylidene fluoride), polyethylene, or a combination thereof.

6. The all-solid secondary battery of claim 1, wherein the ratio of the volume density to the true density of the positive electrode active material layer is about 0.7 to about 0.95.

7. The all-solid secondary battery of claim 1, wherein the negative electrode active material layer is a lithium metal layer.

8. The all-solid secondary battery of claim 1, wherein the lithium-containing alloy is an alloy of lithium metal and at least one of indium, aluminum, tin, and silicon.

9. The all-solid secondary battery of claim 1, wherein the solid electrolyte layer comprises at least one of sulfur, silicon, phosphorus, and boron.

10. The all-solid secondary battery of claim 1, wherein the ratio of the volume density to the true density of the solid electrolyte layer is about 0.75 to about 0.995.

11. The all-solid secondary battery of claim 1, wherein the solid electrolyte layer has an average thickness of about 50 micrometers to about 100 micrometers.

12. The all-solid secondary battery of claim 1, wherein a surface of the cell has an area of about 20 square centimeters to about 1500 square centimeters.

13. The all-solid secondary battery of claim 1, wherein each of the pressure applying members and each of the plurality of pressure control members independently comprises stainless steel, steel, or a resin.

14. The all-solid secondary battery of claim 1, further comprising a pressure measuring film disposed between the pair of pressure applying members, wherein a pressure applied to each pressure application site is measured by applying pressure to the pressure measuring film.

15. The all-solid secondary battery of claim 1, wherein the ratio of volume density to true density of the positive electrode active material layer is about 0.65 to about 0.9;

the ratio of volume density to true density of the solid electrolyte layer is about 0.65 to about 0.9; and the ratio of the standard deviation of the pressure distribution to the average pressure applied to the opposite sides of the cell is about 0.15 to about 0.35.

* * * * *